June 6, 1944.  C. E. MAHAN  2,350,626
INTERNAL COMBUSTION ENGINE
Filed March 29, 1943  3 Sheets-Sheet 1

Clarence E. Mahan INVENTOR.

BY
Victor J. Evans & Co.
ATTORNEYS

June 6, 1944.   C. E. MAHAN   2,350,626
INTERNAL COMBUSTION ENGINE
Filed March 29, 1943   3 Sheets-Sheet 3

Clarence E. Mahan INVENTOR.

BY
Victor J. Evans & Co.
ATTORNEYS

Patented June 6, 1944

2,350,626

UNITED STATES PATENT OFFICE 2,350,626

INTERNAL-COMBUSTION ENGINE

Clarence E. Mahan, Hawthorne, Nev.

Application March 29, 1943, Serial No. 480,983

7 Claims. (Cl. 123—53)

My invention relates to engines, and has among its objects and advantages the provision of an improved internal combustion engine particularly suitable for airplane service.

In the accompanying drawings:

Figure 7 is a diagrammatic sectional view of a connecting rod connection.

Figure 1:
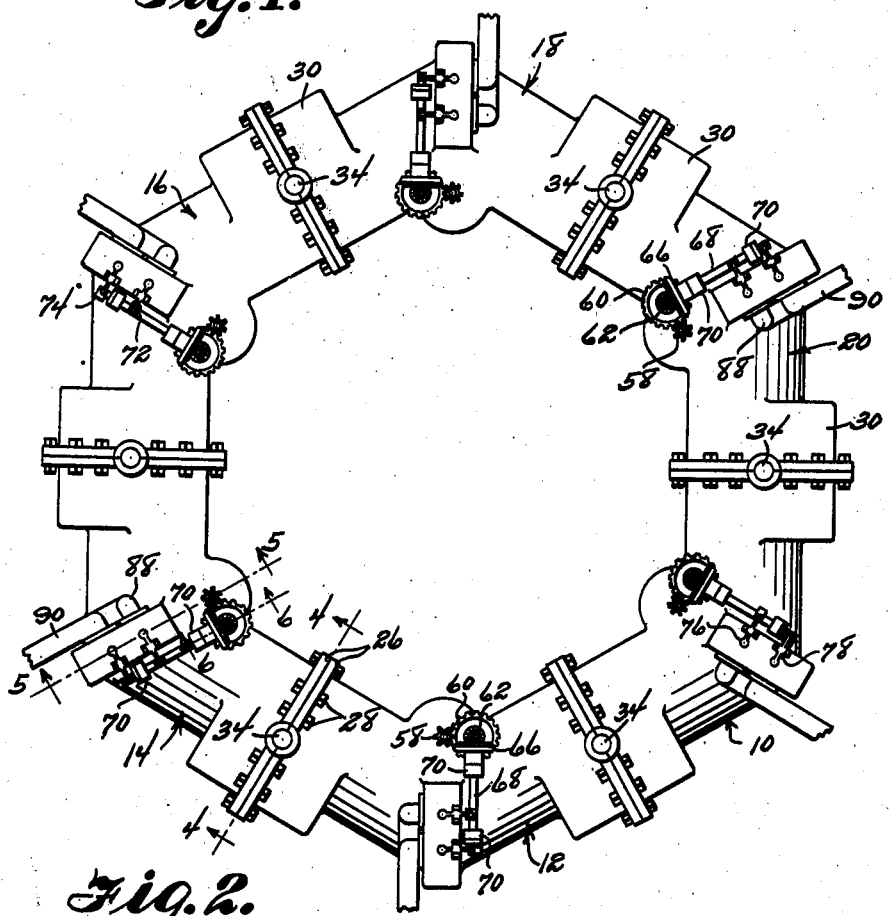
Figure 1 is an end view of my engine.
Figure 3:
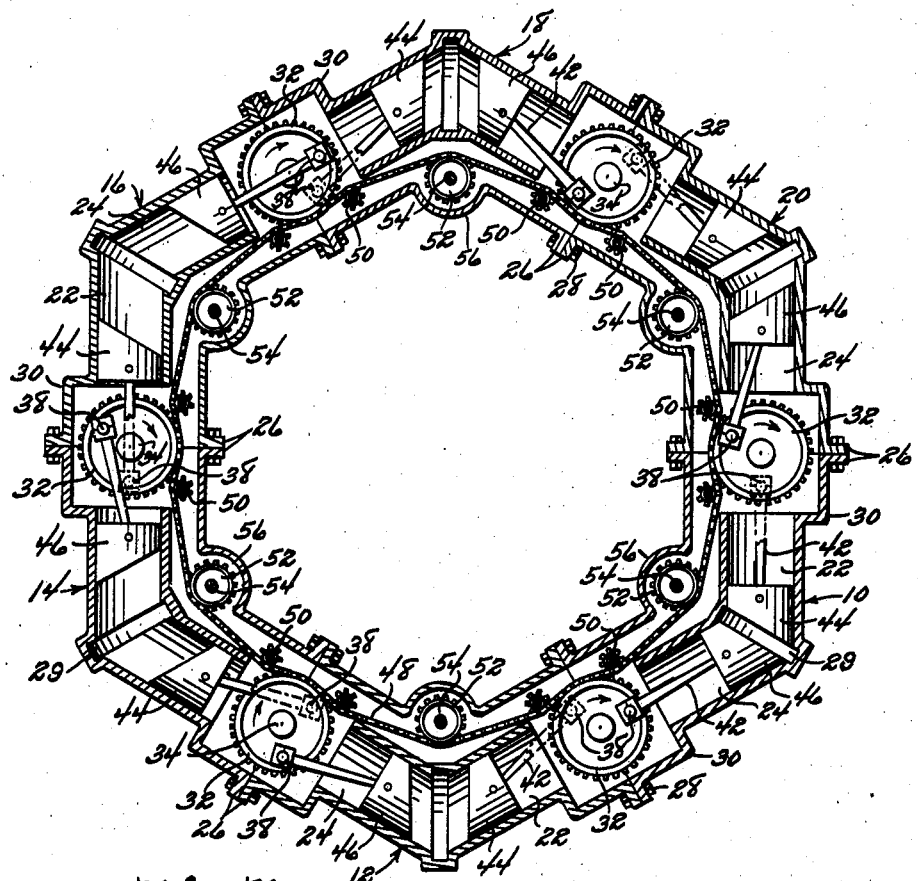
Figure 3 is a sectional view along the line 3—3 of Figure 2.
Figure 4:
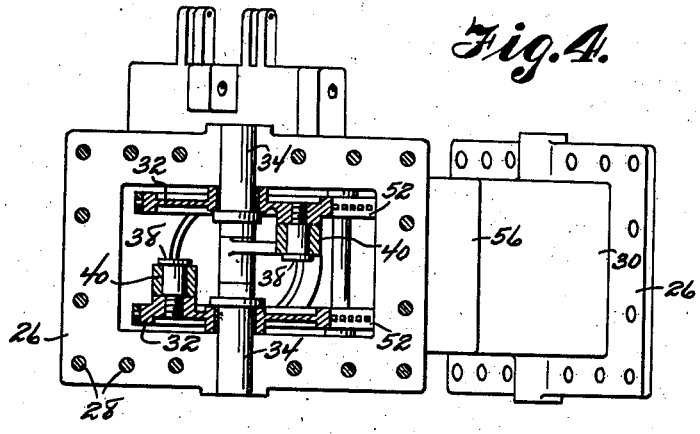
Figure 4 is a sectional view along the line 4—4 of Figure 1.

In the embodiment of the invention selected for illustration, Figures 1 and 3 illustrate six cylinders 10, 12, 14, 16, 18 and 20. Each cylinder 18 is provided with two bores 22 and 24, which are arranged at acute angles to each other. All the cylinders 10 through 20 have end flanges 26, and the cylinders are arranged end to end and fixedly connected into a unitary structure by bolts 28. Thus the engine, when viewed from the end, has the configuration of a six-sided ring. While the bores 22 and 24 of each cylinder are arranged at an angle to each other, one bore 22 of each cylinder is coaxial with the bore 24 in an adjacent cylinder. The bores 22 and 24 of each cylinder have communication through the medium of a firing chamber 29. Each cylinder is in the nature of an elbow, and all the elbows are of the same angularity.

The ends of the cylinders are contoured to provide gear boxes 30. Each gear box contains two gears 32. All the gears 32 are of the same diameter and the two gears in each box 30 are coaxial but rotatably independent. Each gear 32 is attached to a short shaft 34 rotatably supported in a bearing 36.

In Figure 7, the two gears 32 are each provided with a crankpin 38 facing in the direction of the other gear and serving as a mount for the bearing 40 at the end of a connecting rod 42. All the groups of gears 32 are similarly constructed. Each bore 22 is provided with a piston 44 connected with one connecting rod 42. A piston 46 is mounted in each bore 24 and is also connected with one connecting rod 42.

An endless chain 48 meshes with all the gears 32 and is held to the gears 32 by idle gears 50. The idle gears 50 are grouped closely to their respective gears 32 and are located in the gear boxes 30 to maintain greater lengths of the chain 48 in engagement with the gears 32.

Figure 2:
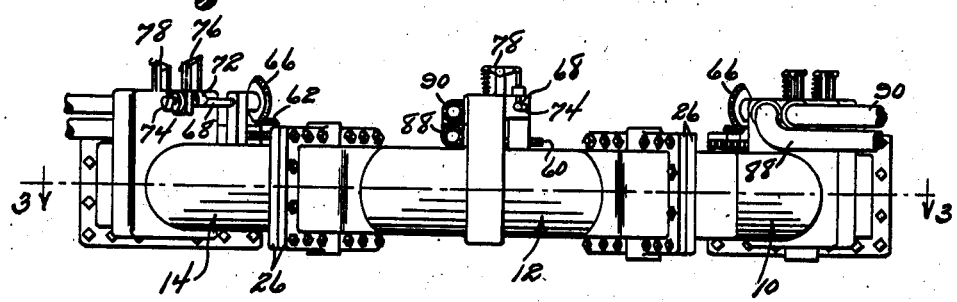
Figure 2 is a top plan view.
Figure 5:
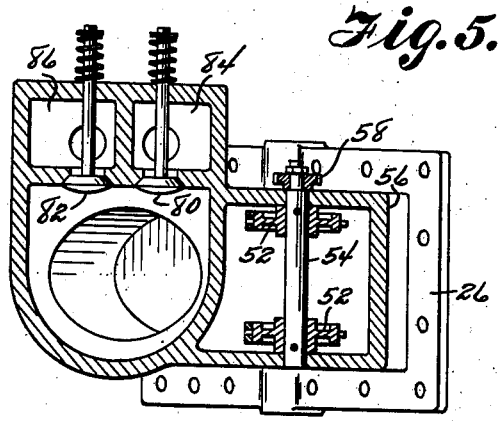
Figure 5 is a sectional view along the line 5—5 of Figure 1.
Figure 6:
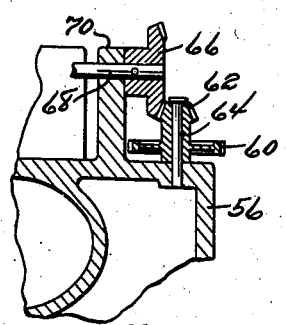
Figure 6 is a sectional view along the line 6—6 of Figure 1.

The chain 48 extends about the inner sides of the cylinders 10 through 20 and also meshes with larger idle gears 52 located radially inside the bends of the respective cylinders. There are two idle gears 52 for each cylinder, and the two gears in each group are keyed to a shaft 54, see Figure 5, rotatably journaled in the side walls of a wall structure 56 constituting a housing for the chain 48 and the idle gears 50 and 52. This wall structure is sectional in conformity with the cylinder structure. To each shaft 54 is attached a pinion 58 lying exteriorly of the wall structure 56. Each pinion 58 meshes with a gear 60 fixed to a small bevel gear 62 rotatably mounted on a support 64 attached to the wall structure 56, see Figure 6. The bevel gears 62 respectively mesh with larger bevel gears 66 attached to shafts 68 rotatably supported in bearings 70 attached to the wall structure 56. The shafts 68 are arranged generally radially of the engine when viewed according to Figure 1, and each shaft is provided with cams 72 and 74 for actuating rocker arms 76 and 78, which in turn operate the intake and exhaust valves 80 and 82, respectively, see Figures 1, 2 and 5. The valves 80 and 82 are associated with intake and exhaust chambers 84 and 86, respectively.

The chambers 84 and 86 are located at the bends in the cylinders.

The propeller (not shown) may be attached to one of the shafts 54. In Figure 3, the pistons 44 and 46 in the cylinder 10 are in their firing positions, the fuel being compressed between those two pistons. The gears 32 rotate clockwise when viewing Figure 3. Beginning with cylinder 10 the cylinders 12, 14, 16, 18 and 20 are progressively advanced one-sixth ahead of the cylinder 10 in a clockwise direction.

The chain 38 and its associated gears are protected by the wall structure 56, which wall structure also functions as a lubricant retainer.

Intake and exhaust conduits 88 and 90 are respectively associated with the chambers 84 and 86.

Without further elaboration, the foregoing will so fully explain my invention, that others may, by applying current knowledge, readily adapt the same for use under various conditions of service.

I claim:

1. An internal combustion engine comprising cylinders of elbow contour connected end to end in the form of a multisided ring, each cylinder having two bores arranged at an angle to each other, pistons in the respective bores, a group of two crank gears between the respective cylinders, one gear in each group having an operating connection with one piston in one cylinder and the other gear in each group having an operating connection with one piston in an adjoining cylinder, and a chain means operatively connected with all said crank gears.

2. The invention described in claim 1 wherein meshing gears hold said chain means in engagement with said crank gears.

3. The invention described in claim 1 wherein meshing gears hold said chain means in engagement with said crank gears, at least one of said idle gears comprising a power take-off.

4. The invention described in claim 1 wherein the two pistons in each cylinder are opposed with respect to each other and spaced to provide a firing chamber therebetween.

5. The invention described in claim 1 wherein the two pistons in each cylinder are opposed with respect to each other and spaced to provide a firing chamber therebetween, the operating connections between the pistons and said chain means being so arranged as to provide a successive firing order from cylinder to cylinder about the engine.

6. The invention described in claim 1 wherein intake and exhaust valves are provided for the respective cylinders, and operating connections between said chain means and the intake and exhaust valves.

7. The invention described in claim 1 wherein the two pistons in each cylinder are opposed with respect to each other and spaced to provide a firing chamber therebetween, intake and exhaust valves for the respective firing chambers, and operating connections between the respective intake and exhaust valves and said chain means.

CLARENCE E. MAHAN.